United States Patent
Chretien et al.

(10) Patent No.: US 12,224,693 B2
(45) Date of Patent: Feb. 11, 2025

(54) SYSTEMS AND METHODS FOR COMPONENT MONITORING IN AN ELECTRIC MOTOR

(71) Applicant: Regal Beloit America, Inc., Beloit, WI (US)

(72) Inventors: Ludovic Andre Chretien, Columbia City, OH (US); Brian Lee Beifus, Fort Wayne, IN (US); Michael R. Koller, Columbia City, IN (US)

(73) Assignee: Regal Beloit America, Inc., Milwaukee, WI (US)

( * ) Notice: Subject to any disclaimer, the term of this patent is extended or adjusted under 35 U.S.C. 154(b) by 0 days.

(21) Appl. No.: 18/474,946

(22) Filed: Sep. 26, 2023

(65) Prior Publication Data
US 2024/0014763 A1    Jan. 11, 2024

Related U.S. Application Data

(63) Continuation of application No. 17/172,853, filed on Feb. 10, 2021, now Pat. No. 11,791,760.

(51) Int. Cl.
| | |
|---|---|
| H02P 23/04 | (2006.01) |
| H02P 27/06 | (2006.01) |
| H02P 29/028 | (2016.01) |

(52) U.S. Cl.
CPC ............ *H02P 29/028* (2013.01); *H02P 27/06* (2013.01)

(58) Field of Classification Search
CPC ........ H02P 29/028; H02P 27/06; H02P 23/02; H02P 29/024; H02P 1/44; H02P 27/047
See application file for complete search history.

(56) References Cited

U.S. PATENT DOCUMENTS

| | | |
|---|---|---|
| 6,801,013 B2 | 10/2004 | Woodward et al. |
| 6,952,088 B2 | 10/2005 | Woodward et al. |
| 7,272,302 B2 | 9/2007 | Woodward et al. |
| 2004/0067049 A1 | 4/2004 | Woodward et al. |
| 2011/0257934 A1 | 10/2011 | Dimino et al. |

(Continued)

FOREIGN PATENT DOCUMENTS

| | | |
|---|---|---|
| CN | 102345915 B | 11/2013 |
| CN | 109375105 B | 12/2020 |

(Continued)

*Primary Examiner* — Muhammad S Islam
(74) *Attorney, Agent, or Firm* — Armstrong Teasdale LLP

(57) ABSTRACT

A motor controller for an electric motor is provided. The motor controller includes an inverter configured to supply current to stator windings of the electric motor. The motor controller further includes a plurality of sensors configured to generate a sensor signal in response to detecting a parameter. The sensor signal represents a measured parameter. The motor controller further includes a processor coupled in communication with the inverter and with the plurality of sensors. The processor is configured to, in a first mode, transmit a control signal to the inverter to operate the electric motor at a first frequency. The processor is further configured to receive the sensor signal from the plurality of sensors. The processor is further configured to determine a first fault condition is present at the electric motor based on the measured parameter represented by the sensor signal.

20 Claims, 4 Drawing Sheets

(56) References Cited

U.S. PATENT DOCUMENTS

| | | | |
|---|---|---|---|
| 2012/0280645 A1* | 11/2012 | Olsson | H02P 23/0077 |
| | | | 318/802 |
| 2015/0054443 A1* | 2/2015 | Swamy | H02P 23/06 |
| | | | 318/504 |
| 2016/0268948 A1* | 9/2016 | Choi | H02H 7/122 |
| 2020/0028462 A1* | 1/2020 | Kim | H02P 27/085 |
| 2021/0025631 A1 | 1/2021 | Mullin et al. | |

FOREIGN PATENT DOCUMENTS

| | | |
|---|---|---|
| CN | 109768741 B | 1/2021 |
| TW | 201211565 A | 3/2012 |

* cited by examiner

SYSTEMS AND METHODS FOR COMPONENT MONITORING IN AN ELECTRIC MOTOR

CROSS-REFERENCE TO RELATED APPLICATIONS

This application is a continuation of, and claims the benefit of priority to, U.S. patent application Ser. No. 17/172,853, filed Feb. 10, 2021, and entitled "SYSTEMS AND METHODS FOR COMPONENT MONITORING IN AN ELECTRIC MOTOR," the contents and disclosures of which are hereby incorporated in their entirety.

FIELD

The field of the disclosure relates generally to electric motors, and more specifically, to motor controllers and methods for monitoring components of an electric motor using motor controllers.

BACKGROUND

At least some known induction motors are fixed speed motors that operate most efficiently at line frequency power. Such induction motors exhibit uncontrolled acceleration during startup. Further, at low load conditions, such induction motors operate less efficiently. Alternatively, an induction motor may be driven with a variable speed motor controller to adapt motor speed to a load level. Such configurations are generally limited by power factor, electromagnetic interference, and electrical losses.

Providing a drive circuit for induction motors enables efficient operation at both high and low load conditions. For example, an induction motor operating a compressor in a heating, ventilation and air conditioning (HVAC) system may experience high load conditions during peak temperatures and low load conditions during milder temperatures. The drive circuit operates the induction motor using an inverter in a low-speed mode under low load conditions, and operates the induction motor using line frequency power in a high-speed mode under high load conditions.

Because the motor controller, the inverter, the induction motor, and other components of the drive system may each originate from a different manufacturer, drive systems generally are not capable of determining which, if any, components of the drive system is malfunctioning when a fault condition or failure occurs within the drive system. For example, the system may indicate the motor controller of the system is under a fault condition, when in fact the fault originates at the induction motor. An improved system for component monitoring within an electric motor drive system is therefore desirable.

BRIEF DESCRIPTION

In one aspect, a motor controller for an electric motor is provided. The motor controller includes an inverter configured to supply current to stator windings of the electric motor. The motor controller further includes a plurality of sensors configured to generate a sensor signal in response to detecting a parameter. The sensor signal represents a measured parameter. The motor controller further includes a processor coupled in communication with the inverter and with the plurality of sensors. The processor is configured to, in a first mode, transmit a control signal to the inverter to operate the electric motor at a first frequency. The processor is further configured to receive the sensor signal from the plurality of sensors. The processor is further configured to determine a first fault condition is present at the electric motor based on the measured parameter represented by the sensor signal.

In another aspect, a method for controlling a drive system is provided. The method includes, in a first mode, transmitting, by a processor, a control signal to an inverter coupled in communication with the processor, the inverter configured to supply current to stator windings of an electric motor, the control signal causing the inverter to operate the electric motor at a first frequency. The method further includes receiving, by the processor a sensor signal from a plurality of sensors coupled in communication with the processor, the plurality of sensors configured to generate a sensor signal in response to detecting a parameter, the sensor signal representing a measured parameter. The method further includes determining, by the processor, a first fault condition is present at the electric motor based on the measured parameter represented by the sensor signal.

In another aspect, a drive system is provided. The drive system includes an electric motor including stator windings. The drive system further includes a motor controller. The motor controller includes an inverter configured to supply current to the stator windings. The motor controller further includes a plurality of sensors configured to generate a sensor signal in response to detecting a parameter. The sensor signal represents a measured parameter. The sensor signal further includes a processor coupled in communication with the inverter and with the plurality of sensors. The processor is configured to, in a first mode, transmit a control signal to the inverter to operate the electric motor at a first frequency. The processor is further configured to receive the sensor signal from the plurality of sensors. The processor is further configured to determine a first fault condition is present at the electric motor based on the measured parameter represented by the sensor signal.

DETAILED DESCRIPTION

Embodiments of the drive system include a motor controller for an electric motor. The motor controller includes an inverter configured to supply current to stator windings of the electric motor, a plurality of sensors configured to generate a sensor signal in response to detecting a parameter, the sensor signal representing a measured parameter, and a processor coupled in communication with the inverter and with the plurality of sensors. The processor is configured to transmit a control signal to the inverter to operate the electric motor at a first frequency. The processor is further configured, while transmitting the control signal or while idling, to receive the sensor signal from the plurality of sensors. The processor is further configured to determine a first fault condition is present at the electric motor based on the measured parameter represented by the sensor signal. For example, the processor may detect a short circuit, an overload, an open phase, a line overcurrent, an unexpected power factor, a motor type mismatch (e.g., between configuration for a permanent split capacitor or a brushless DC motor) or other faults of the electric motor based on data received from the plurality of sensors. Accordingly, faults within the drive system can be more easily and accurately attributed to a specific part of the system, such as the electric motor, motor controller, or external components such as a relay or a run capacitor. This enables operators to more quickly repair the drive system, decreasing the amount of time the drive system and associated systems (e.g., an HVAC system in which the drive system is installed) are inoperable due to such faults.

In some embodiments, the drive system is capable of supplying current to the electric motor directly from a line power source. In such embodiments, the processor is further configured to cease transmitting the control signal to the inverter that causes the inverter to operate the electric motor, and to close a contactor to electrically couple the electric motor directly to a line power source to operate the electric motor at a second frequency. In such embodiments, the processor is further configured to determine a fault condition is present in the contactor. For example, the processor may detect a failure to open, a failure to close, an unenergized relay coil, or other faults of the contactor based on data received from the plurality of sensors. Further, a fault may be detected on the run capacitor by monitoring power factor, and a fault may be detected at idle when the contactor has failed, for example, by becoming welded shut.

In some embodiments, the fault conditions that may be detected by the drive system include one or more of an inverter short circuit, a ground fault, an overload, a shorted contactor, an open contactor, or a damaged run capacitor. Additionally, the drive system may detect other fault conditions based on sensor measured parameters of the drive system.

Figure 1:
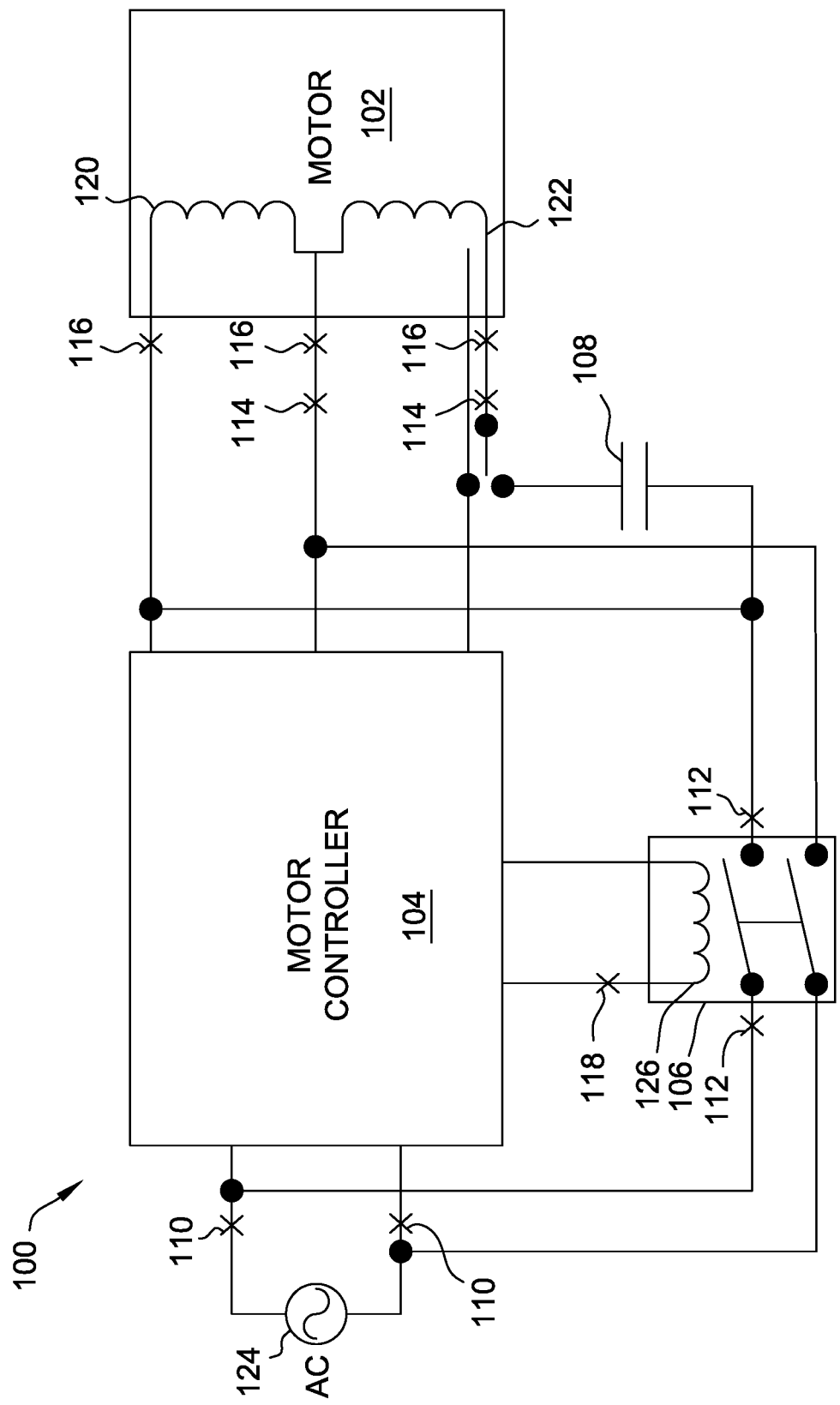
FIG. 1 is a schematic diagram of an exemplary drive system.

FIG. 1 is a schematic diagram of a drive system 100. Drive system 100 includes an electric motor 102, a motor controller 104, a contactor 106, and a run capacitor 108. Drive system 100 further includes a plurality of sensors, including a line current sensor 110, a contactor voltage sensor 112, a back electromagnetic force (EMF) voltage sensor 114, inverter phase current sensors 116, and a contactor current sensor 118.

Electric motor 102 includes a stator and a rotor configured to rotate in response to current applied to windings of the stator. In certain embodiments, the rotor is coupled to and configured to turn, for example, a compressor or a fan of an HVAC system. In some embodiments, electric motor 102 is an induction motor, such as a permanent split capacitor (PSC) motor that includes a main winding 120 and a start winding 122. As described in further detail below, current may be supplied to main winding 120 and start winding 122 by motor controller 104 or directly from a line power source 124. The current signal provided to start winding 122 generally has a phase offset from that provided to main winding 120, for example, by 90 degrees, which ensures the rotor rotates in a particular, desired direction upon a startup of electric motor 102.

Motor controller 104 is electrically coupled to a line power source 124 and to electric motor 102 and is configured to supply current to the stator windings of electric motor 102. In certain embodiments, motor controller 104 is electrically coupled to main winding 120 and to start winding 122 and is configured to supply current phases to main winding 120 and start winding 122. In some embodiments, motor controller is configured to vary the frequency of the current signal provided to the stator windings, such that electric motor 102 may be controlled to operate according to a desired speed, torque, power, or other parameter. For example, in certain embodiments, motor controller 104 is coupled to a system controller (not shown) such as a thermostat that may instruct motor controller to operate according to different operating modes corresponding to different operating frequencies of electric motor 102.

Contactor 106 is electrically coupled between the line power source 124 and the phases of main winding 120, and includes a switch corresponding to each phase. In certain embodiments, an electromagnetic interference (EMI) filter or other protective devices may be coupled between contactor 106 and line power source 124. In certain embodiments, contactor 106 is a relay. Alternatively, contactor 106 may be a solid state switch or another type of switching device. Contactor 106 is coupled in communication with motor controller 104 and configured to open or close in response to a control signal generated by motor controller 104. When closed, contactor 106 connects the stator windings of electric motor 102 directly to the line power source 124, enabling electric motor 102 to be supplied current directly through the line power source 124. For example, motor controller 104 may be configured to operate in two modes. In the first mode (sometimes referred to herein as the "inverter mode"), motor controller 104 opens contactor 106 and supplies current to the stator windings using the inverter. In the second mode (sometimes referred to herein as the "direct line mode"), motor controller 104 closes contactor 106 and deactivates the inverter, so main winding 120 is supplied current directly from the line power source 124, and start winding 122 is supplied current via run capacitor 108 to ensure the desired phase difference is maintained between main winding 120 and start winding 122. In some embodiments, motor controller 104 generally operates in the inverter mode, and when motor controller 104 is commanded to operate electric motor 102 at a frequency within a threshold of the frequency of the line input, motor controller 104 operates in the direct line mode. Accordingly, drive system 100 may operate with increase energy efficiency when electric motor 102 operates at the line frequency.

Line current sensor 110, contactor voltage sensor 112, back EMF voltage sensor 114, inverter phase current sensor 116, and contactor current sensor 118 are each coupled in communication with motor controller 104 and configured to detect or measure a specific parameter and generate a signal (sometimes referred to herein as a "sensor signal") representing the detected or measured parameter (sometimes referred to herein as "sensor data").

Line current sensor 110 is configured to detect a line current at each phase of the line current input and transmit the detected line current to motor controller 104. In some embodiments, line current sensor 110 is at least partially integrated into motor controller 104. By detecting the line current, motor controller 104 is able to determine whether the current of the line power source 124 is within an appropriate range, for example, with respect to amplitude and phase, for operation of electric motor 102 when motor controller 104 is operating in the direct line mode. A phase difference of the detected current with respect to the AC line input voltage would indicate inadequate power factor and possible issues with the stator windings or run capacitor 108.

Contactor voltage sensor 112 is configured to detect a voltage across contactor 106 representative of AC line input voltage and transmit the detected voltage to motor controller 104. In some embodiments, contactor voltage sensor 112 is at least partially integrated into motor controller 104.

Back EMF voltage sensor 114 is configured to detect a voltage of contactor 106 and transmit the detected voltage to motor controller 104. In some embodiments, back EMF voltage sensor 114 is at least partially integrated into motor controller 104 At idle, voltage should be zero indicative contactor is indeed open. When operating in the direct line mode, a voltage should be present indicating contactor is indeed closed. Accordingly, by detecting the back EMF voltage, motor controller 104 is able to determine whether electric motor 102 is operating appropriately. For example, if motor controller 104 is operating electric motor 102 in the inverter mode or direct line mode, yet no back EMF voltage is present, motor controller 104 may determine another component of drive system 100 is not functioning properly or a fault condition is present. In some embodiments, motor controller 104 is configured to utilize a combination of data from different sensors to determine a specific fault condition. For example, when motor controller 104 is operating electric motor 102 in the direct line mode, motor controller 104 may utilize back EMF voltage sensor 114 to determine contactor 106 correctly closed as commanded. If contactor 106 is closed but no current flows, one pole of contactor 106 or the stator windings may be at issue. If current flows but the phase, and hence power factor, is inadequate for proper operation, the stator windings or run capacitor 108 may have failed. In some embodiments, further diagnostics may be performed after motor controller 104 returns to the inverter mode.

Inverter phase current sensor 116 is configured to detect a current of each phase of main winding 120 of electric motor 102 and transmit the detected current to motor controller 104. In some embodiments, inverter phase current sensor 116 is at least partially integrated into motor controller 104. By detecting the inverter phase current, motor controller 104 may determine, for example, whether electric motor 102 is operating appropriately when motor controller 104 is operating electric motor 102 in the inverter mode. For example, motor controller 104 may detect a short circuit or an open phase at electric motor 102.

In some embodiments, based on sensor data received from, for example, line current sensor 110 or inverter phase current sensor 116, motor controller 104 is configured to compute a power factor of electric motor 102. Motor controller 104 may use the computed power factor to determine, for example, that run capacitor 108 or start winding 126 has failed.

Contactor current sensor 118 is configured to detect a current at, for example, a relay coil 126 of contactor 106, and transmit the detected current to motor controller 104. In some embodiments, contactor current sensor 118 is at least partially integrated into motor controller 104. By detecting the current at contactor 106, motor controller 104 is able to determine whether contactor 106 is operating appropriately according to the control command from motor controller 104. For example, motor controller 104 may determine that relay coil 126 is not energizing properly to open or close contactor 106 in response to the contactor signal generated by motor controller 104.

Figure 2:
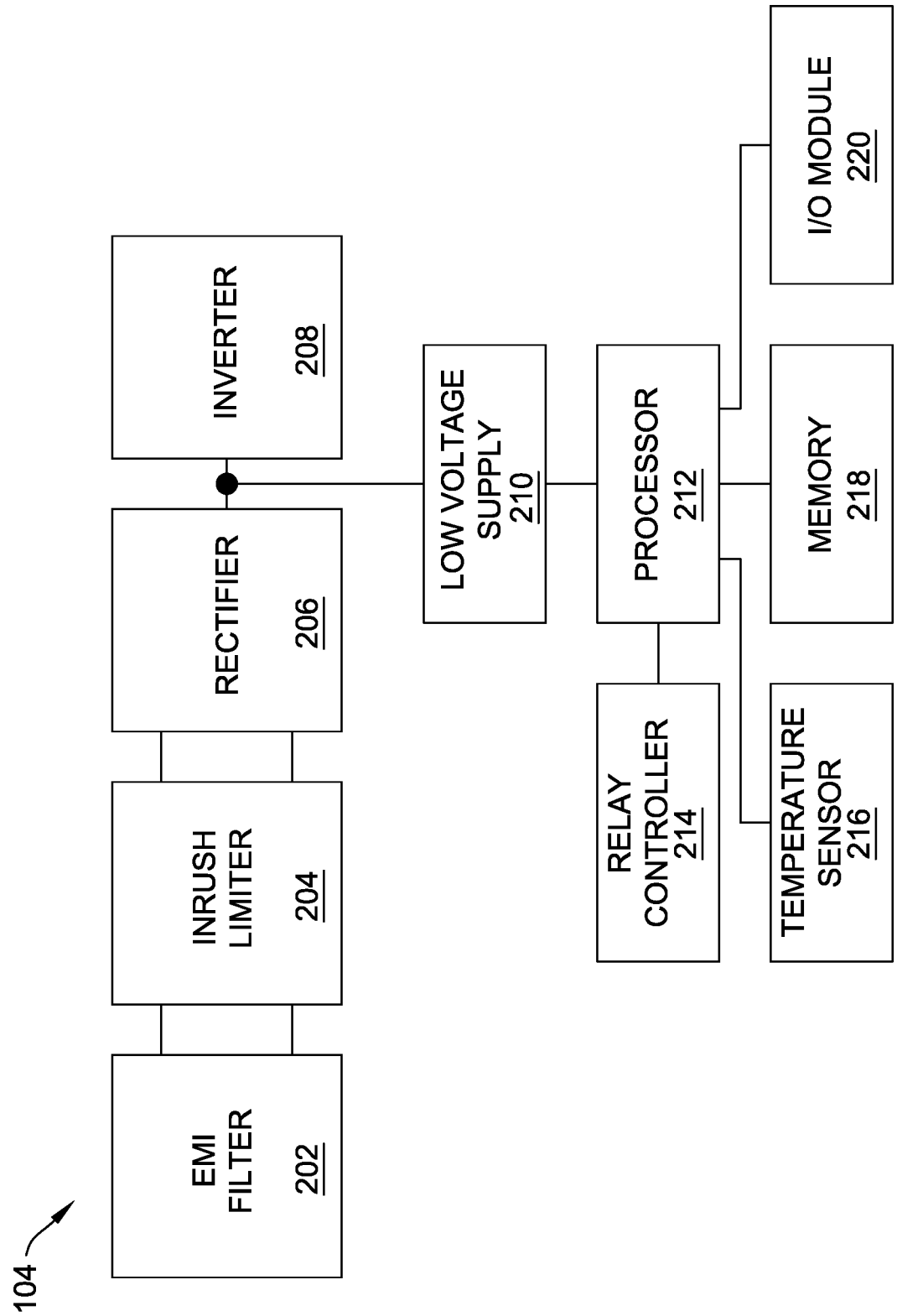
FIG. 2 is schematic diagram of an exemplary motor controller that may be used in the drive system shown in FIG. 1.

FIG. 2 is a schematic diagram of motor controller 104. Motor controller 104 includes an EMI filter 202, an inrush limiter 204, a rectifier 206, an inverter 208, low voltage supply 210, a processor 212, a contactor controller 214, and a temperature sensor 216, a memory 218, and an input/output (I/O) module 220.

EMI filter 202, inrush limiter 204, and rectifier 206 are electrically coupled in parallel with the line power source 124. EMI filter 202 is configured to filter undesired electromagnetic interference, and inrush limiter 204 limits a current at the power input of motor controller 104, to protect components motor controller 104 from damage. Rectifier 206 converts an alternating current (AC) line input signal provided by line power source 124 to a direct current (DC) signal that powers inverter 208, low voltage supply 210, and other components of motor controller 104.

Inverter 208 is electrically coupled to rectifier 206 and electric motor 102 (shown in FIG. 1) and is configured to convert the DC signal generated by rectifier 206 to an AC signal suitable for supplying current to the stator windings of electric motor 102. Inverter 208 includes a plurality of switches configured to operate in response to a control signal generated by processor 212. Accordingly, inverter 208 may be operated to provide current to electric motor 102 at a demanded frequency, or to cease providing current to electric motor 102 when contactor 106 is closed and electric motor 102 is driven directly by the line power source 124.

Low voltage supply 210 is electrically coupled to rectifier 206 and is configured to supply power to low power components of motor controller 104, such as processor 212, contactor controller 214, and temperature sensor 216, memory 218, and I/O module 220. In some alternative embodiments, rather than being coupled to rectifier 206, low voltage supply may include a battery or connection to an external power source.

Processor 212 is coupled in communication with inverter 208 and is configured to generate a control signal to control the switches of inverter 208 based on an operating command. For example, processor 212 may be in communication with an external system controller configured to transmit commands to processor 212 to operate electric motor 102 according to a desired speed, frequency, power, or other operating parameter.

Contactor controller 214 is coupled in communication with contactor 106 and processor 212 and is configured to control contactor 106 based on control signals received from processor 212. For example, contactor controller 214 may generate a signal that causes contactor 106 to open or close, such as a current signal that activates a relay winding of contactor 106.

Temperature sensor 216 is coupled in communication with processor 212 and is configured to detect an ambient temperature at one or more locations within drive system 100 or a temperature of one or more components within drive system 100 and transmit the detected temperature to processor 212. In some embodiments, temperature sensor 216 is at least partially integrated into processor 212. By detecting the temperature at one or more locations within drive system 100, processor 212 is able to determine whether a fault condition is present, for example, if a measured ambient temperature falls outside a threshold range of expected temperatures. In some embodiments, temperature sensor 216 is configured to detect a temperature of components in addition to those of drive system 100. For example, when drive system 100 is installed in an HVAC system, temperature sensor 216 may detect a temperature of air moving through the HVAC system, which may enable processor 212 to determine whether components of the HVAC system, such as the compressor, are functioning properly.

In some embodiments, motor controller 104 further includes memory 218 coupled in communication with processor 212. In some such embodiments, memory 218 is configured to store instructions that may be read and executed by processor 212. In some such embodiments, processor 212 is configured to store sensor data and diagnostic data such as fault records in memory 218.

In some embodiments, motor controller 104 further includes I/O module 220 coupled in communications with processor 212. In such embodiments, I/O module 220 is configured to communicate with devices external to drive system 100, for example, using wired or wireless communication. For example, processor 212 may receive, via I/O module 220, commands from a system controller such as a thermostat or an application executing on a device such as a smart phone, tablet computer, or personal computer. In some such embodiments, processor 212 is further configured to transmit data to the external devices, such alerts, sensor data, diagnostic data, or fault data indicating components of drive system 100 that have potentially failed.

Figure 3:
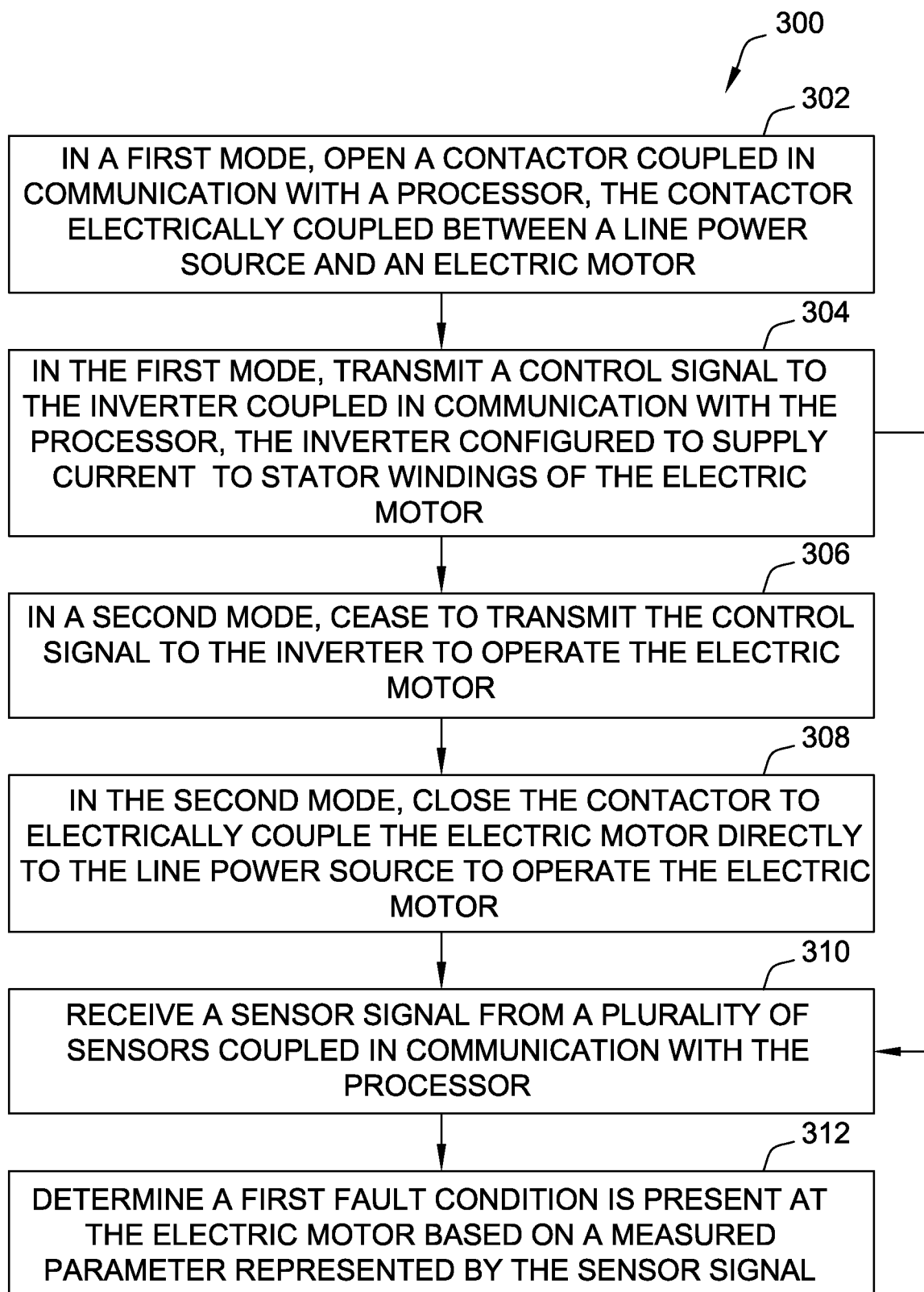
FIG. 3 is a flowchart of an exemplary method for controlling a drive system.

FIG. 3 is a flowchart illustrating an exemplary method 300 for operating a drive system such as drive system 100 (shown in FIG. 1). In some embodiments, method 300 is performed by motor controller 104 (shown in FIG. 1), for example, using processor 212 (shown in FIG. 2).

Motor controller, 104, in a first mode opens 302 contactor 106 coupled in communication with the processor 212. Contactor 106 is electrically coupled between line power source 124 and electric motor 102.

Motor controller 104, in the first mode, transmits 304 a control signal to inverter 208 coupled in communication with processor 212. Inverter 208 is configured to supply current to stator windings of electric motor 102. The control signal causes inverter 208 to operate electric motor 102 at a first frequency.

Motor controller 104, in a second mode, ceases 306 to transmit the control signal to inverter 208 to operate electric motor 102.

Motor controller 104, in the second mode, closes 308 contactor 106 to electrically couple electric motor 102 directly to line power source 128 to operate electric motor 102 at a second frequency. In some such embodiments, electric motor 102 includes main winding 120 and start winding 122 electrically coupled to inverter 208, and motor controller 104 couples start winding 122 to line power source 124 run capacitor 108 when contactor 106 is closed.

Motor controller 104, receives 310 a sensor signal from a plurality of sensors coupled in communication with processor 212. The plurality of sensors is configured to generate a sensor signal in response to detecting a parameter. In some embodiments, the plurality of sensors includes one of more of line current sensor 110, contactor voltage sensor 112, a back EMF voltage sensor 114, inverter phase current sensors 116, contactor current sensor 118, or temperature sensor 216.

Motor controller 104 determines 312, when operating in the first mode, a first fault condition is present at electric motor 102 based on the measured parameter represented by the sensor signal. In some embodiments, motor controller 104 ceases transmitting the control signal to inverter 208 to operate electric motor 102 in response to determining the first fault condition is present at electric motor 102. Similarly, in some embodiments, motor controller 104 determines, when operating in the second mode, a second fault condition is present at the contactor based on the sensor signal. In some embodiments, motor controller 104 determines a fault condition is present when motor controller 104 is idling, contactor 106 is open, and current is not supplied to electric motor 102.

Figure 4:
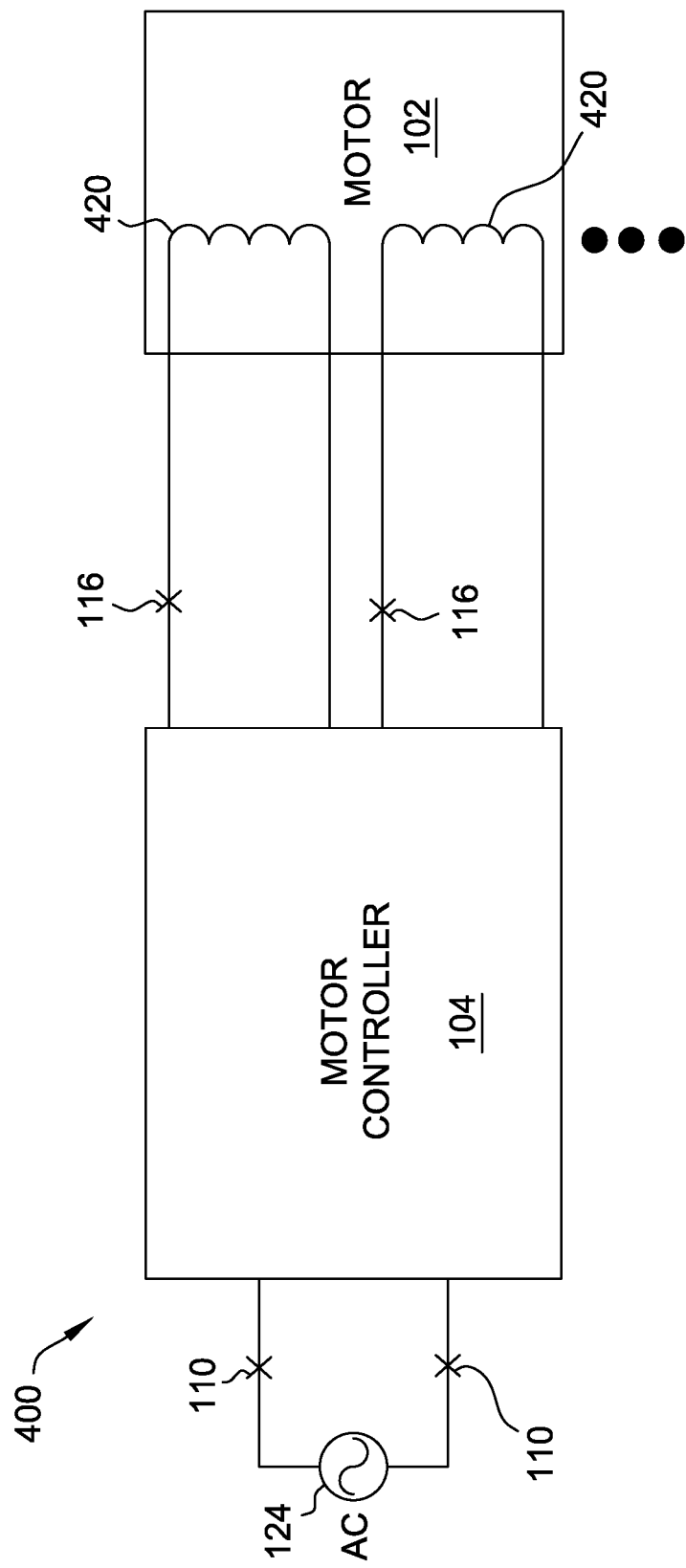
FIG. 4 is a schematic diagram of another exemplary drive system.

FIG. 4 is a schematic diagram of another exemplary drive system 400. Drive system 400 includes electric motor 102 and motor controller 104, which generally function as described with respect to FIG. 1. In the embodiment depicted in FIG. 4, electric motor 102 is a brushless DC (BLDC) motor that includes a plurality of BLDC stator windings 402, to which motor controller 104 may supply pulses of current. Inverter phase current sensors 116 may detect a current at each BLDC stator winding 402. In some embodiments, motor controller 104 is configured to determine a motor type of motor 104. For example, if motor controller 104 is initially configured to supply current to a PSC motor, such as that depicted in FIG. 1, and sensor data received form inverter phase current sensors 116 indicate that motor controller 102 is in fact coupled to a BLDC motor, such as that depicted in FIG. 4, motor controller 102 may, for example, determine that a fault condition is present and deactivate. In some such embodiments, motor controller 104 is configured to detect the motor type of electric motor 102 and automatically adjust to supply current suitable for operation of the detected motor type. While stator windings 402 are depicted as independent in FIG. 4, in some embodiments, stator windings 402 may be connected at some point, such as, for example, three-phase Y-connected windings.

The methods and systems described herein may be implemented using computer programming or engineering techniques including computer software, firmware, hardware or any combination or subset thereof, wherein the technical effect may include at least one of: (a) enabling a motor controller coupled to an electric motor to identify a fault condition in the electric motor using one or more sensors; (b) enabling a motor controller coupled to an electric motor and configured to drive the electric motor using an inverter in a first mode and directly via a line power source in a second mode by closing a contactor coupled between the electric motor and the line power input to identify a fault condition in the contactor using one or more sensors; (c) enabling a motor controller to identify a fault condition in a run capacitor of an electric motor by computing a power factor of the electric motor; and (d) decreasing time required to repair an inoperable drive system by identifying one or more components of the drive system that have failed.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for an electric motor of a drive system, said motor controller comprising:
    an inverter configured to supply current to stator windings of the electric motor;
    a plurality of sensors configured to generate a sensor signal in response to detecting a parameter, the sensor signal representing a measured parameter;
    a processor coupled in communication with said inverter and with said plurality of sensors, said processor configured to:
        in a first mode, transmit a control signal to said inverter to operate the electric motor at a first frequency;
        receive the sensor signal from said plurality of sensors; and
        determine a first fault condition is present based on the measured parameter represented by the sensor signal, wherein the first fault condition indicates a fault within the drive system.

2. The motor controller of claim 1, wherein said motor controller is further configured to cease transmitting the control signal to said inverter to operate the electric motor in response to determining the first fault condition is present at the electric motor.

3. The motor controller of claim 1, wherein said motor controller is further coupled in communication with a contactor, said contactor electrically coupled between a line power source and the electric motor, wherein said processor is further configured to:
    in the first mode, open said contactor;
    in a second mode, cease transmitting the control signal to said inverter to operate the electric motor; and
    in the second mode, close said contactor to electrically couple the electric motor directly to the line power source to operate the electric motor at a second frequency.

4. The motor controller of claim 3, wherein said processor is further configured to determine a second fault condition is present at said contactor based on the sensor signal, wherein the second fault condition indicates a miswiring of said contactor.

5. The motor controller of claim 4, wherein said processor is further configured to:
operate in the first mode in response to determining that one of the first fault condition or the second fault condition is present; and
perform further diagnostics based on the sensor signal after operating in the first mode in response to determining one of the first fault condition or the second fault condition is present.

6. The motor controller of claim 3, wherein the electric motor includes a main winding and a start winding, said main winding and said start winding electrically coupled to said inverter, wherein said start winding is configured to be coupled to the line power source via a run capacitor when said contactor is closed.

7. The motor controller of claim 6, wherein said processor is further configured to determine a third fault condition is present at the run capacitor based on the sensor signal.

8. The motor controller of claim 3, wherein said plurality of sensors comprises a line current sensor configured to detect a current at the line power source.

9. The motor controller of claim 1, wherein said plurality of sensors further comprises an inverter phase current sensor configured to detect a current of at least one phase of said inverter provided to the electric motor.

10. The motor controller of claim 1, wherein said plurality of sensors further comprises a temperature sensor configured to detect at least one of an ambient temperature or an electronic component temperature.

11. The motor controller of claim 1, further configured to identify the first fault condition as one of an inverter short circuit, a ground fault, an overload, a shorted contactor, an open contactor, or a damaged run capacitor.

12. The motor controller of claim 1, further configured to determine, based on the measured parameter, that a motor type of the electric motor is one of a permanent split capacitor (PSC) motor or a brushless DC (BLDC) motor.

13. A method for controlling a drive system, said method comprising:
in a first mode, transmitting, by a processor, a control signal to an inverter coupled in communication with the processor, the inverter configured to supply current to stator windings of an electric motor, the control signal causing the inverter to operate the electric motor at a first frequency;
receiving, by the processor, a sensor signal from a plurality of sensors coupled in communication with the processor, the plurality of sensors configured to generate a sensor signal in response to detecting a parameter, the sensor signal representing a measured parameter; and
determining, by the processor, a first fault condition is present based on the measured parameter represented by the sensor signal, wherein the first fault condition indicates a fault within the drive system.

14. The method of claim 13, further comprising ceasing, by the processor, to transmit the control signal to the inverter to operate the electric motor in response to determining the first fault condition is present at the electric motor.

15. The method of claim 13, further comprising:
in the first mode, opening, by the processor, a contactor coupled in communication with the processor, the contactor electrically coupled between a line power source and the electric motor;
in a second mode, ceasing, by the processor, to transmit the control signal to the inverter to operate the electric motor; and
in the second mode, closing, by the processor, the contactor to electrically couple the electric motor directly to the line power source to operate the electric motor at a second frequency.

16. The method of claim 15, further comprising determining, by the processor, a second fault condition is present at the contactor based on the sensor signal, wherein the second fault condition indicates a miswiring of said contactor.

17. The method of claim 15, wherein the electric motor includes a main winding and a start winding, the main winding and the start winding electrically coupled to the inverter, said method further comprising coupling the start winding to the line power source via a run capacitor when the contactor is closed.

18. A drive system comprising:
an electric motor comprising stator windings; and
a motor controller comprising:
an inverter configured to supply current to said stator windings;
a plurality of sensors configured to generate a sensor signal in response to detecting a parameter, the sensor signal representing a measured parameter;
a processor coupled in communication with said inverter and with said plurality of sensors, said processor configured to:
in a first mode, transmit a control signal to said inverter to operate the electric motor at a first frequency;
receive the sensor signal from said plurality of sensors; and
determine a first fault condition is present based on the measured parameter represented by the sensor signal, wherein the first fault condition indicates a fault within said drive system.

19. The drive system of claim 18, further comprising a contactor coupled in communication with said motor controller, said contactor electrically coupled between a line power source and said electric motor, wherein said processor is further configured to:
in the first mode, open said contactor;
in a second mode, cease transmitting the control signal to said inverter to operate the electric motor; and
in the second mode, close said contactor to electrically couple said electric motor directly to the line power source to operate said electric motor at a second frequency.

20. The drive system of claim 19, wherein said processor is further configured to determine a second fault condition is present at said contactor based on the sensor signal, wherein the second fault condition indicates a miswiring of said contactor.

* * * * *